US007396194B2

(12) United States Patent
Jones, III

(10) Patent No.: US 7,396,194 B2
(45) Date of Patent: Jul. 8, 2008

(54) ADJUSTABLE CLAMPING ARRANGEMENT FOR MAGNETIC MOUNTING PLATE

(75) Inventor: Rutland M. Jones, III, Severn, MD (US)

(73) Assignee: Washington Suburban Sanitary Commission, Laurel, MD (US)

(*) Notice: Subject to any disclaimer, the term of this patent is extended or adjusted under 35 U.S.C. 154(b) by 333 days.

(21) Appl. No.: 11/352,271

(22) Filed: Feb. 13, 2006

(65) Prior Publication Data

US 2007/0189867 A1 Aug. 16, 2007

(51) Int. Cl.
*B23B 41/00* (2006.01)
*B23B 45/14* (2006.01)

(52) U.S. Cl. ......................... 408/76; 408/103; 248/646; 248/674; 248/681

(58) Field of Classification Search ................... 408/76, 408/88, 95, 98, 103, 108, 109, 234, 712; 409/178–179; 269/1–2, 152, 154, 203, 249, 269/246; 254/131; 248/646, 674, 676, 680, 248/681; *B23B 45/00, 45/14, 41/00*
See application file for complete search history.

(56) References Cited

U.S. PATENT DOCUMENTS 2,160,274 A * 5/1939 Lopez ........................ 408/112
3,175,465 A * 3/1965 Fuller et al. ................. 409/132
3,617,142 A * 11/1971 De Wane et al. ............ 408/103
3,791,755 A * 2/1974 Warren ........................ 408/76
4,047,827 A * 9/1977 Hougen ....................... 408/76
4,121,815 A * 10/1978 Paterson ..................... 269/203
4,242,016 A * 12/1980 Faris ........................... 408/14
4,390,309 A * 6/1983 Fangmann ................... 408/76
5,352,070 A * 10/1994 Tehrani ....................... 408/102

FOREIGN PATENT DOCUMENTS

GB 2278076 A * 11/1994
JP 2000240079 A * 9/2000

* cited by examiner

*Primary Examiner*—Daniel W Howell
(74) *Attorney, Agent, or Firm*—Millen, White, Zelano & Branigan, P.C.

(57) ABSTRACT

A drill press is magnetically mounted on a steel plate which is clamped to a manhole cover by three L-shaped clamps. The L-shaped clamps are mounted in slots defined by brackets located on the periphery of the steel plate. Enlargements are provided on the L-shaped clamps to keep the L-shaped clamps from falling out of the slots.

6 Claims, 5 Drawing Sheets

ADJUSTABLE CLAMPING ARRANGEMENT FOR MAGNETIC MOUNTING PLATE

FIELD OF THE INVENTION

The present invention is directed to a adjustable clamping arrangement for a steel mounting plate. More particularly, the present invention is directed to a steel mounting plate used to mount a drill press used to bore holes in manhole covers.

BACKGROUND OF THE INVENTION

Manhole covers have holes drilled two inches in diameter and are used when installing remote reading devices in the covers for water flow meters in water supply systems, or to provide filtered vent openings in manhole covers for sewage systems.

In the past manhole covers had to be delivered to an off-site shop and on-site location for drilling 2" diameter holes to installing remote devices and vent holes. The drilling procedure requires two-inch diameter solid-bits. Transporting manholes was a time consuming, expensive and inconvenient task. The current approach is to use a hollow drill bit magnetically mounted on a semi-circular plate that is clamped on site to the manhole cover. The drilling press is similar to drill presses used for maintenance and construction of bridges, wherein the drill presses are secured by electromagnetics to metal bridge structures. The uneven surface of a manhole cover makes it impossible to effectively mount an electromagnetic drill press directly on the manhole cover. The semi-circular plate provides a smooth surface for magnetically holding a drill press on a manhole cover while the semi-circular plate is clamped to manhole cover.

Clamping the semi-circular plate to the manhole cover has proved difficult because the clamps can become detached during transport, storage and use. Consequently, when the plate and drill press arrive at the site, missing clamps cause substantial inconvenience.

SUMMARY OF THE INVENTION

An adjustable steel plate having an arcuate periphery defined by an arcuate rim projecting below the plate magnetically mounts a drill press on a manhole cover. A plurality of brackets are arranged in spaced relation on the arcuate rim of the plate and an L-shaped clamp in slidably disposed in each bracket. Each L-shaped clamp has a first leg extending in the direction of the axis and a second leg extending radially inward toward the axis, with the first leg being slidably mounted in the bracket. The bracket has a first screw for engaging the first leg to the axially position the L-shaped clamp with respect to the steel plate and to hold the second leg in clamping position with respect to the manhole cover. A second screw is threaded through the manhole cover in alignment with the second leg of the L-shaped bracket for positively clamping the plate to the manhole cover. An enlargement is disposed on the first leg of the L-shaped clamp. The enlargement has a dimension greater than the opening defined by the bracket through which the first leg is received, so that the L-shaped clamp is loosely retained in the bracket until the first screw is tightened.

In another aspect, the bracket defines a substantially rectangular slot while the first arm has a substantially rectangular cross-section which is slidably received in the slot and the enlargement is at a free end of the first arm.

In another aspect, the enlargement extends tangentially with respect to the arcuate rim.

In another aspect, the enlargement is a rod which extends across and beyond the arm.

BRIEF DESCRIPTION OF THE DRAWINGS

From the foregoing description, one skilled in the art can easily ascertain the essential characteristics of this invention, and without departing form the spirit and scope thereof, can make various changes and modifications of the invention to adapt it to various usages and conditions.

DETAILED DESCRIPTION

Figure 1:
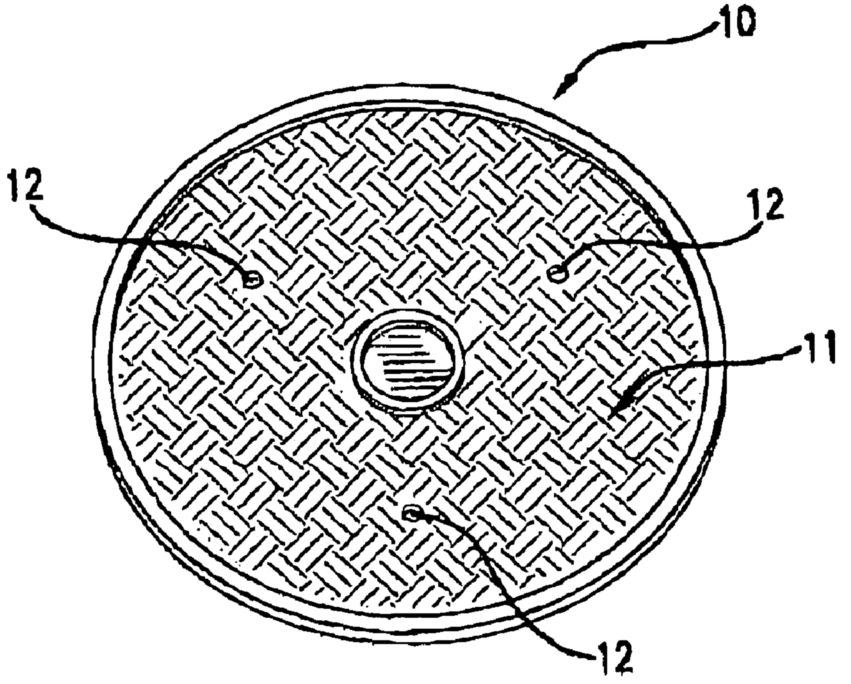
FIG. 1 is a top view of a manhole cover having holes drilled therein for venting or readouts.

FIG. 1 shows a manhole cover 10 having a plurality of holes 12 drilled through the top surface 13 of the cover. In FIG. 1, the holes 12 are three in number, but may be whatever number is sufficient to accomplish the purpose of the holes. The holes 12 are used as vents in manhole covers positioned over manhole accesses to sewer lines so to vent explosive gases and thus preventing explosions and sewer odor control.

Figure 2:
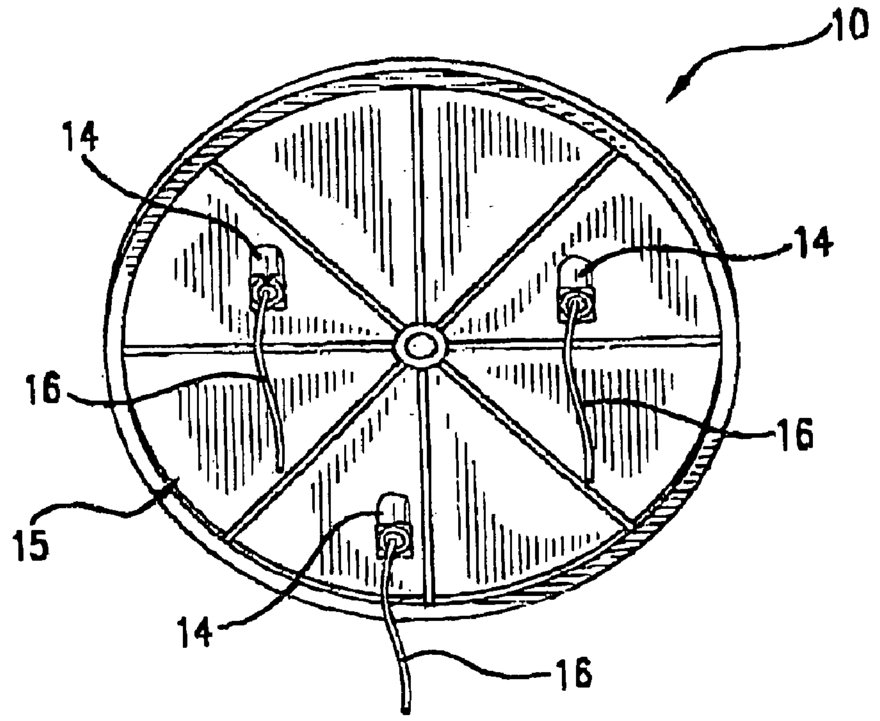
FIG. 2 is a bottom perspective view of readouts attached to the bottom of the manhole cover in alignment with the holes.

FIG. 2 shows another use for the vent holes 12 wherein readouts 14 positioned on a back surface 15 of a manhole cover 10 to monitor water flow meters (not shown) that measure water flow through water pipes which are remote from the manhole cover. The readouts 14 are connected to the water flow meters by electrical leads 16 so that the flow meters may be monitored from the top surface 11 (see FIG. 1) of the manhole 10. This arrangement allows water flow meters to be read from the surface of the ground by service vehicles.

Figure 3:
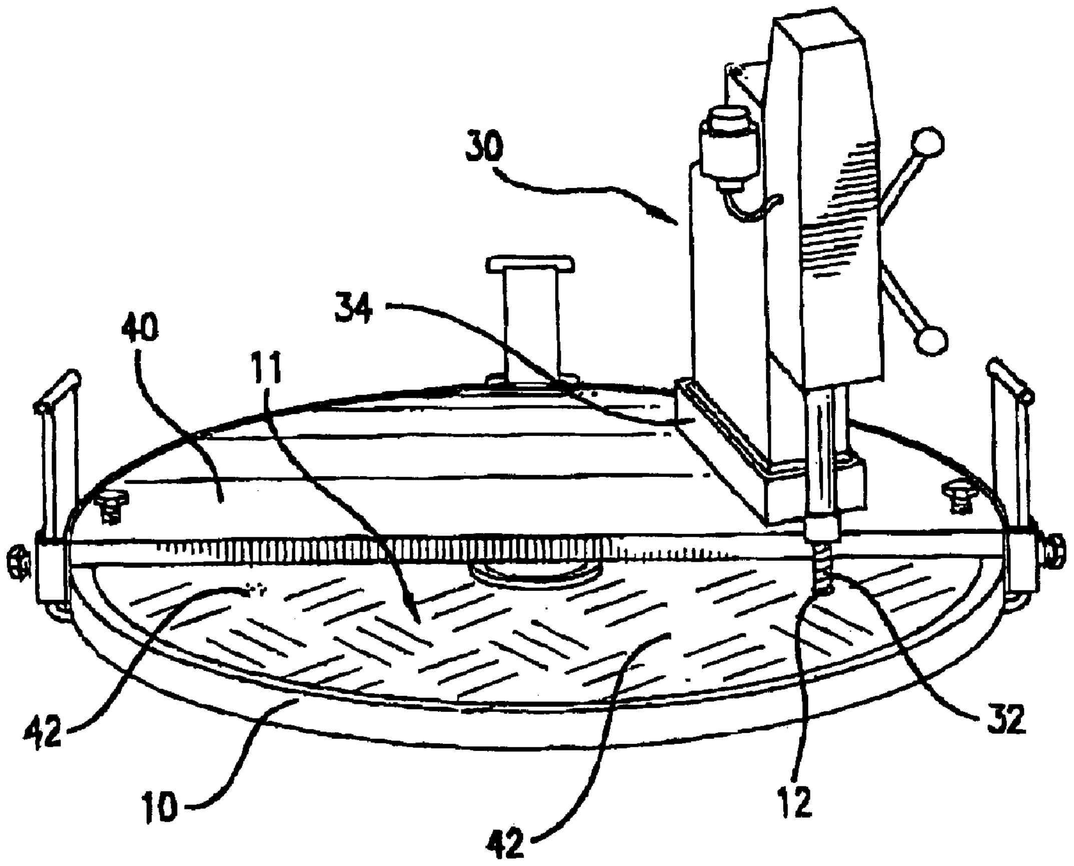
FIG. 3 is a top perspective view showing a magnetic drill press mounted on a manhole cover for boring the holes of FIG. 1 and 2 through the manhole cover.

It is less expensive and more convenient to bore the holes 12 through the manhole covers 10 on site, rather than to transport the manhole covers to maintenance facilities to have the holes drilled. As is seen in FIG. 3, a magnetically mounted drill press 30 drills the holes 12 with a rotating bit 32. The drill press 30 is similar to drills used for drilling holes through steel bridge structures and has an electromagnetic 34 thereon that holds the drill press 30 on a mounting plate 40. The drill press 30 is initially positioned on the mounting plate 40 with the drill bit 32 aligned with locations 42 that are identified by dye that contrasts with the top surface 11 of the manhole cover 10. When the drill bit 32 is properly aligned, the electromagnetic 34 is energized to hold the drill press 30 in place as a hole 12 is drilled through the manhole cover. After the hole is drilled, the electromagnetic 34 is deenergized so that the drill press 30 may be moved to a different location on the plate 40 or lifted entirely from the plate 40.

Figure 4:
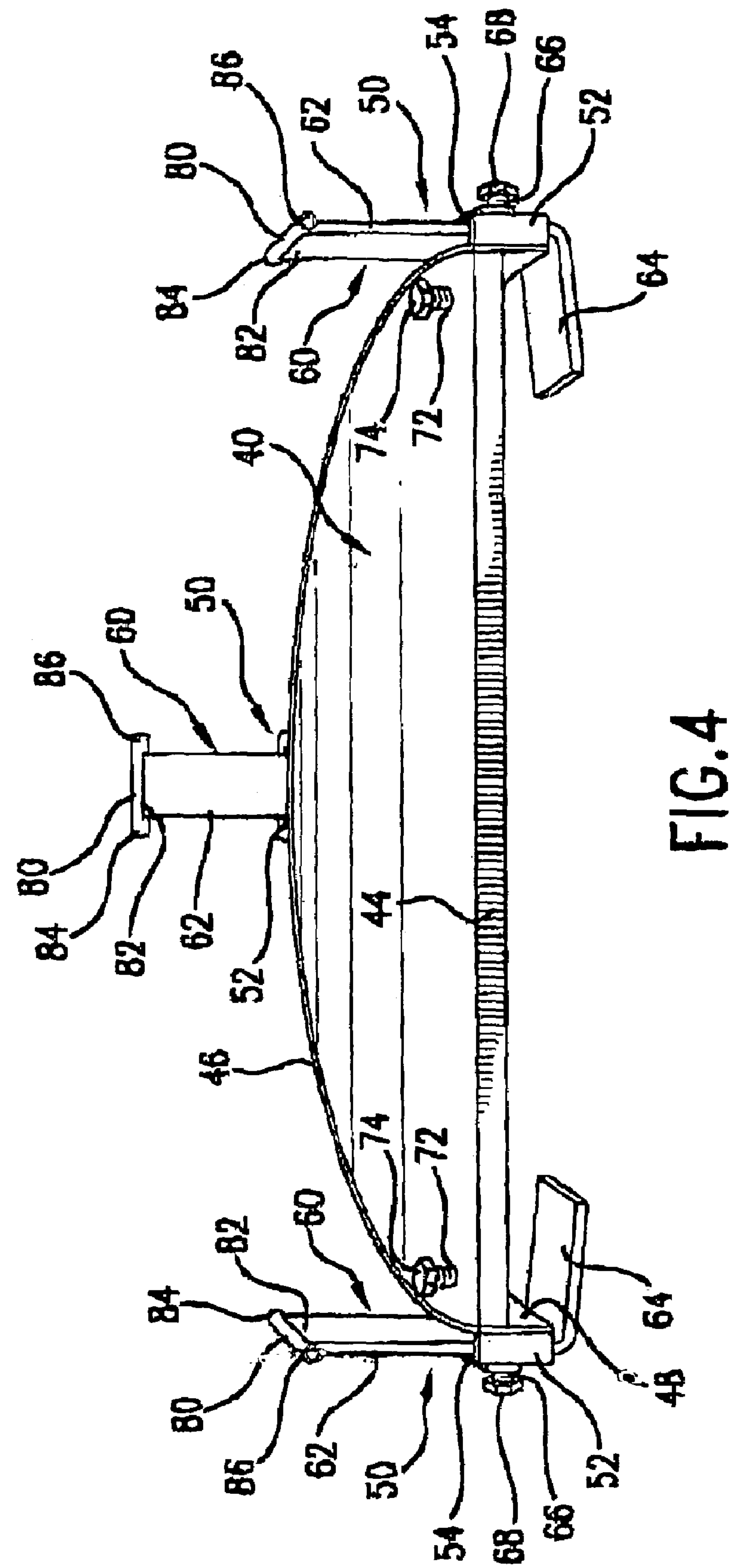
FIG. 4 is a side perspective view of a plate used to mount the magnetic drill of FIG. 3 with mounting clamps.
Figure 5:
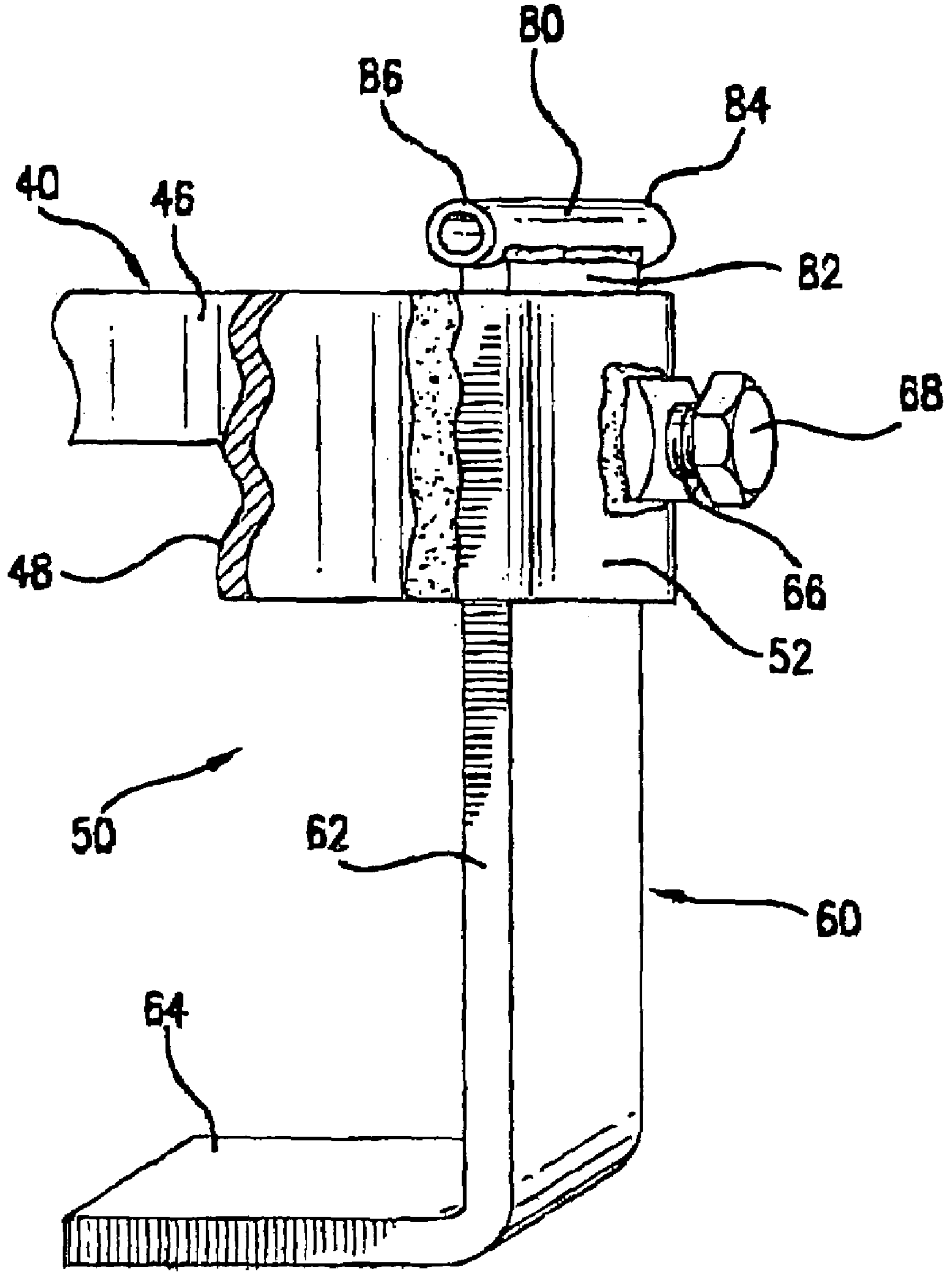
FIG. 5 is a view of one of the mounting clamps in a fully opened position.
Figure 6:
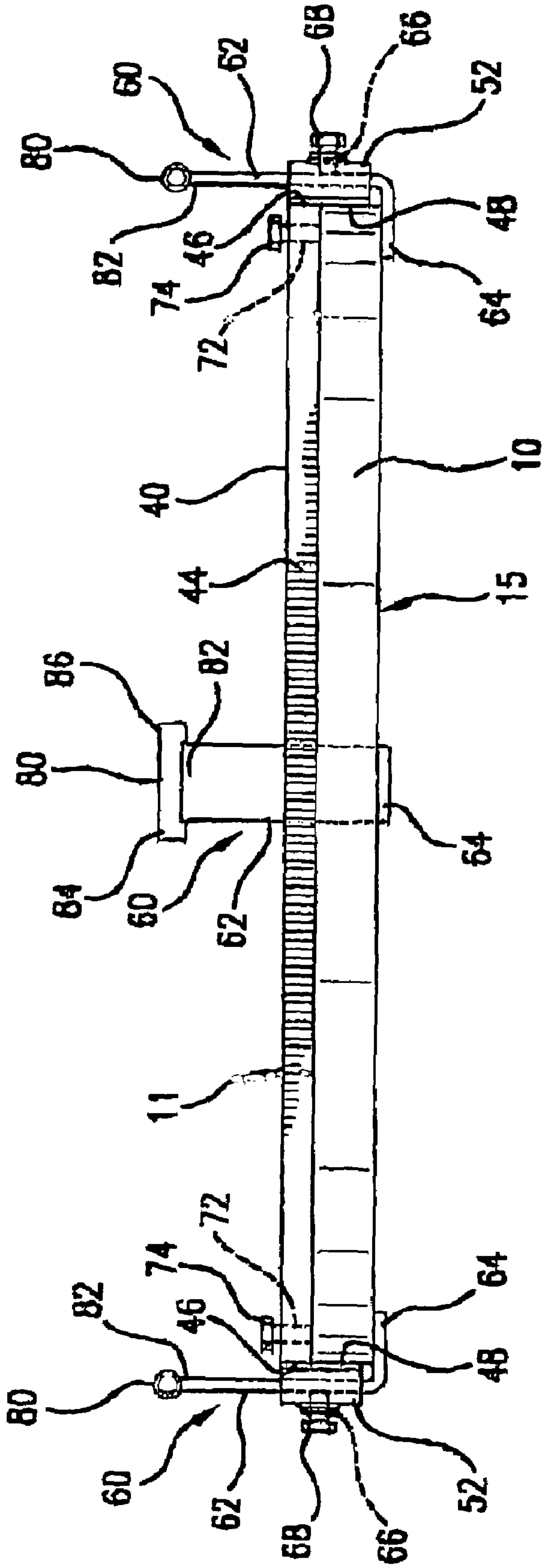
FIG. 6 is a view of mounting clamps holding the plate on a manhole cover prior to mounting the drill of FIG. 3 on the plate.

As is apparent from FIGS. 4-6, the mounting plate 40 is preferably semi-circular and has a chord edge 44 which is preferably, but not necessarily, substantially equal to the diameter of the manhole cover 10. Around the arcuate edge 46 of the plate is a peripheral rim 48 which fits around the periphery of the manhole cover. During drilling the drill bit 32 preferably drills at locations adjacent to the chord 44. If necessary, the mounting plate 44 may be shifted in order to drill at any location or the manhole cover 10.

In order to secure the plate 40 on the manhole cover, a plurality of clamping arrangements 50, preferably three in number, are attached to the peripheral rim 48. Each clamping plate includes a bracket 52 that in the preferred embodiment is welded to the rim 48. Each of the brackets 52 is U-shaped and has a slot 54 therethrough, which in the illustrated embodiment is a substantially rectangular. Mounted in each slot 54 is an L-shaped clamping member 60. The L-shaped clamping members 60 each have a first arm 62 that is slidably received in one of the slots 54 defined by the brackets 52, and each have a second arm 64, that projects transversely from the first arm and radially beneath the plate 40.

Each of the brackets 52 further has a first threaded bore 66 in which a first bolt 68 is threaded. Initially, the first bolts 68 are backed off out of engagement with the first arm 62 so that the L-shaped clamps 60 can slide in the slots 54. After the plate 40 is mounted on the top surface 11 of a manhole cover 10, with the arcuate peripheral rim 48 abutting the edge of the manhole cover, the L-shaped clamps 60 are each pulled up so that the second arms 64 engage the rear surface 15 of the manhole cover. The first bolts 68 are then tightened so as to hold the mounting plate 40 in place on the manhole cover 10.

Adjacent to the first leg 62 of the L-shaped clamps 60 are second threaded bores 72 that receive second bolts 74. The second bolts 74 are then rotated to advance down the threaded bores 72 until they abut and apply force to the top surface 11 of the manhole cover 10. This more securely fastens the mounting plate 40 to the manhole cover 10.

Each of the first legs 62 of the L-shaped clamps 60 has an enlarged portion 78 thereon. In the illustrated embodiment, the enlarged portion 78 is a bar 80 that is welded to the free end 82 of the first arm 62 of the L-shaped clamp 60. End portions 84 and 86 of the bar 80 project beyond the generally rectangular first leg 62 so that the L-shaped clamps 60 will not fall out of the slots 54 that pass through the brackets 52. Consequently, the L-shaped clamps 60 are attached to the mounting plates 40 and are not separate members which can be misplaced, lost or left behind when the hole drilling operation is performed on site.

While bars 80 with projecting end portions 84 and 86 are illustrated in FIGS. 4-6, other configurations for the enlargements 78 provided by the bars 80 may be utilized, such as but not limited to, bent portions of the first arms 62 that extend transversely thereto so that the first arms may not slide out of the slots 54. Other arrangements may include plates that are welded into the top of the first arms 62, weld deposits on the first arms or bolts which pass transversely through the arms 62 that do not allow the L-shaped claims 60 to escape the slots 54.

From the foregoing description, one skilled in the art can easily ascertain the essential characteristics of this invention, and without departing form the spirit and scope thereof, can make various changes and modifications of the invention to adapt it to various usages and conditions.

We claim:

1. An arrangement for mounting a drill press on a manhole cover comprising:

an adjustable plate having an arcuate periphery defined by an arcuate rim projecting below the plate and being substantially concentric with an axis of the arcuate periphery; wherein the plate mounts the drill press on a manhole cover;

an electromagnetic fixing the drill press to the plate;

a plurality of brackets located in spaced relation on the arcuate rim of the plate and an L-shaped clamp slidably disposed in a slot in each bracket;

the L-shaped clamp having a first arm extending in the direction of the axis and a second arm extending radially inward toward the axis with the first arm being slidably mounted in the bracket;

the bracket having a first screw for engaging the first arm to an axial position, the first arm in the bracket holding the second arm in clamping position with respect to the manhole cover;

a second screw threaded through the manhole cover in alignment with the second arm for clamping the plate to the manhole cover, and an enlargement disposed on the first arm of the L-shaped clamp, which enlargement has a dimension larger than the slot in the bracket through which the first arm is received, wherein the L-shaped clamp is loosely retained in the slot in the bracket by the arrangement and second arm until the first screw is tightened.

2. The adjustable plate arrangement of claim 1 wherein the bracket defines a substantially rectangular slot and wherein the first arm has a substantially rectangular cross-section which is slidably received in the slot and the enlargement is at a free end of the first arm.

3. The arrangement of claim 2 wherein the enlargement extends substantially tangential to the arcuate rim.

4. The arrangement of claim 3 wherein the enlargement comprises pin portions which extend laterally of the plate.

5. The arrangement of claim 4 wherein the enlargement is a rod which extends across and beyond the arm.

6. The arrangement of claim 5 wherein there are three brackets on the rim and wherein there is an L-shaped clamp in each bracket.

* * * * *